United States Patent
Presley et al.

[15] 3,684,011
[45] Aug. 15, 1972

[54] MOBILITY CONTROL BY PARTIAL PLUGGING OF FORMATIONS

[72] Inventors: C. Travis Presley, 6891 S. Prince Circle, Littleton, Colo. 80120; Perry A. Argabright, RR-1 Perry Park Ranch, Sedalia, Colo. 80135

[22] Filed: Nov. 16, 1970

[21] Appl. No.: 89,883

[52] U.S. Cl. .................166/270, 166/274, 166/275
[51] Int. Cl. ................................................E21b 43/22
[58] Field of Search......166/270, 269, 272, 273, 274, 166/275, 292, 295, 300

[56] References Cited

UNITED STATES PATENTS

| | | |
|---|---|---|
| 3,614,985 | 10/1971 | Richardson.................166/300 |
| 3,195,630 | 7/1965 | Fisher.......................166/292 |
| 3,396,790 | 8/1968 | Eaton........................166/270 |
| 2,272,672 | 2/1942 | Kennedy....................166/270 |
| 2,747,670 | 5/1956 | King et al. ................166/270 |
| 2,903,065 | 9/1959 | Holbrook et al...........166/272 |
| 3,118,500 | 1/1964 | Maddox, Jr. et al...166/292 X |
| 3,522,844 | 8/1970 | Abdo.........................166/270 |
| 3,490,533 | 1/1970 | McLaughlin...............166/270 |
| 3,375,872 | 4/1968 | McLaughlin et al.......166/292 |

*Primary Examiner*—Stephen J. Novosad
*Attorney*—Joseph C. Herring and Richard C. Willson, Jr.

[57] ABSTRACT

Mobility control in both secondary and tertiary subterranean oil recovery processes is improved by reducing the permeability of the reservoir through injecting an aqueous solution containing salts of isocyanuric acid, (optionally also containing thickening agents), which undergoes chemical change in the reservoir to form a precipitate and thereafter displacing such aqueous solutions through the formation by injecting drive fluids. Reduction in permeability is controlled by pH, reservoir temperature, and concentration of the isocyanuric salt. Preferably, the aqueous solution is displaced a distance away from the well bore by injection of the drive fluids before precipitation occurs. Preferably the aqueous solution is preceded by a slug of controlled mobility displacing fluid, most preferably by a miscible or miscible-type displacing fluid.

10 Claims, 3 Drawing Figures

MOBILITY CONTROL BY PARTIAL PLUGGING OF FORMATIONS

CROSS REFERENCES TO RELATED APPLICATIONS

The following U.S. Patent applications relate to the general field of the invention: Ser. No. 72,388, filed 9/15/70, Ser. No. 72,288, filed 9/15/70, Ser. No. 111,422, filed 2/1/71, Ser. No. 715,199, filed 3/22/68, now U.S. Pat. No. 3,573,259, Ser. No. 872,380, filed 10/29/69, now U.S. Pat. No. 3,625,964, Ser. No. 715,182, filed 3/22/68, now abandoned, Ser. No. 682,576, filed 11/13/67, now U.S. Pat. No. 3,549,630.

BACKGROUND OF THE INVENTION

1. Field of the Invention

The present invention relates to the field of petroleum recovery as classified in Class 166 of the U.S. Patent Office entitled "Wells."

2. Description of the Prior Art

Many patents and other literature have disclosed mobility control agents for use in secondary and tertiary recovery, or for other purposes, e.g., U.S. Pat. Nos. 2,827,964 (partially hydrolyzed acrylamide polymers), 3,067,161 (water-soluble linear, high molecular weight monoalkenylaromatic sulfonate polymers), 3,370,649 (partially hydrolyzed acrylamides), 3,282,337 (polyvinyl aromatic sulfonates), 3,039,529 (high molecular weight hydrolyzed acrylamide), 3,054,778 (acetic anhydride modified polyurethane), 2,961,400 (cellulose), 2,843,545 (formaldehyde-aliphatic polyamine), alginates (Chemical Engineering, Nov. 3, 1969, p. 42), U.S. Pat. Nos. 2,842,492 (copolymers of ethylenically unsaturated carboxylic acid), 2,731,414 (carboxymethyl cellulose), 2,771,138 (synthetic polymer, sucrose, etc.), 2,866,754 (aluminum octoate-acetic acid or phenolic compound mixtures), 3,002,960 (special polyacrylamides), British Pat. Nos. 1,194,160 (water-soluble powders having reversible acetal cross links produced by coating the powders with formaldehyde or aliphatic dialdehyde and a catalyst), 3,493,000 (polydimethylsiloxane), U.S. Pat. No. 2,728,725 (water-soluble cellulose derivative), U.S. Pat. Nos. 2,874,124 (polyvinyloxazolidone), 2,740,522 (water-soluble, anionic, linear addition polymers of polymerizable monoethylenically unsaturated compounds), 2,729,557 (polyelectrolytes produced by polymerizing one or more mono-olefinic compounds through the aliphatic unsaturated group), 3,000,830 (polyvinylpyrrolidone), 2,625,529 (polyacrylamides and other water-soluble polymers), 3,039,529 (water-soluble high molecular weight hydrolyzed polyacrylamides).

None of the above patents or publications teach the present invention with its ability to partially plug formations so as to decrease their permeability without eliminating it.

SUMMARY

General Statement of the Invention

None of the aforementioned literature teaches a controlled rate of precipitation of compounds from water solutions with the advantage of controlled permeability reduction.

The present invention offers new methods for increasing the efficiency of secondary recovery operations by permitting the permeability of the formation to be controlled, thus permitting control of the ratio of the mobility of the drive fluid to a displaced fluid (the "mobility ratio").

Further, the present invention permits reduction in permeability at distances away from the well bore. In the annular zones surrounding the well bore, permeability reduction is generally undesirable because the fluids being injected must travel through this zone at a relatively high velocity. For example, a frontal advance of 1 foot per day (f/d) measured at a front which is 1,000 feet from the well bore requires a fluid velocity of 100 f/d measured 10 feet from the well bore. Such high velocities near the well bore form a "bottleneck" which causes high pressure drop and requires excess pumping pressure to be exerted in injecting the fluids into the formation.

The present invention permits controlled timing of precipitation over a period of from a few minutes to many days allowing for ease of placement of the plugging solution into the formation at the points desired. The present invention can reduce high permeability formation to a permeability of less than 30 percent of the original permeability. According to the invention, aqueous solutions of molecules containing isocyanurate rings, more preferably containing isocyanuric acid groups and their derivatives, are adjusted in concentration and in pH so as to provide the desired rate of precipitation in view of the temperature prevailing in the formation and other factors. Importantly, it is possible by adjusting concentration and/or by moving the solutions of the invention through the formation during the precipitation phase to cause partial plugging of the formation without completely blocking the formation.

Preferably, in order to maintain maximum permeability in the "bottleneck" immediately surrounding the well bore, the aqueous solutions of the invention are first injected, then displaced some distance away from the well bore by the injection of additional drive fluid before substantial precipitation occurs. The distance by which solutions are preferably displaced away from the well bore can be 3 to about 300, more preferably 5 to about 150, and most preferably 10 to about 100 feet. Reduction in permeability is controlled by pH, reservoir temperature, concentration of the isocyanuric salt, etc.

Utility of the Invention

As described above, the invention is useful for the improvement of secondary and tertiary recovery operations widely used in the recovery of petroleum.

DESCRIPTION OF THE PREFERRED EMBODIMENTS

Starting Materials

Figure 1:
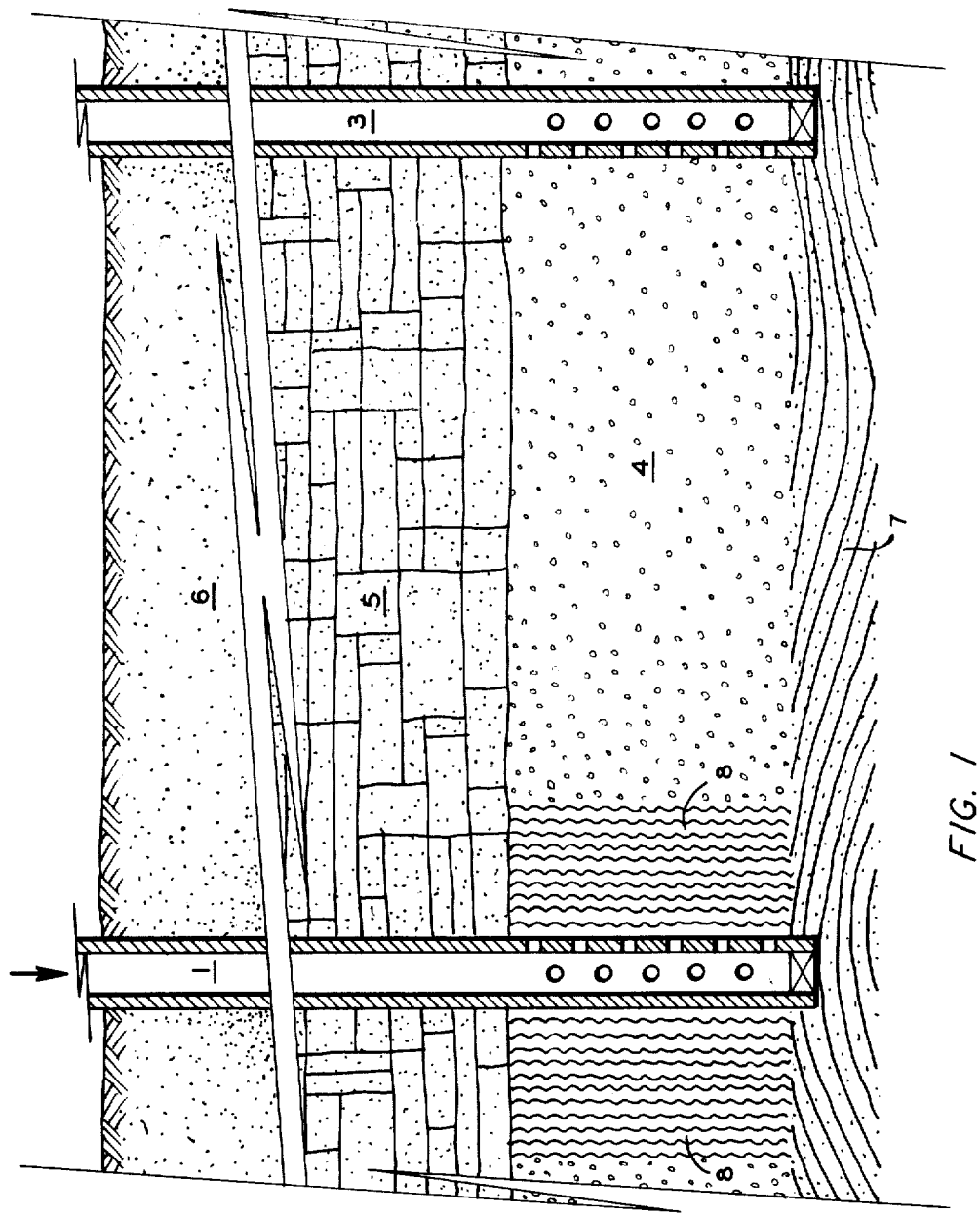
FIGS. 1 through 3 represent schematically three separate stages of a preferred embodiment of the invention.

The plugging materials for use in the present invention are water-soluble materials, preferably compounds containing isocyanurate rings which gradually react to form precipitates, preferably aqueous solutions of compounds containing isocyanuric acid rings or their derivatives and most preferably polyisocyanurate compounds having the structure:

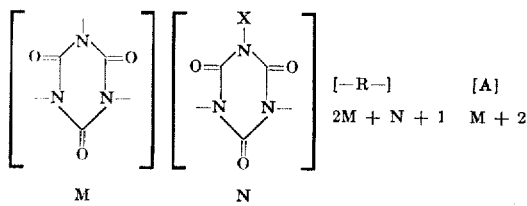

where
R = divalent radical
X = a metal (e.g., Na, K, Li) or hydrogen, quaternary ammonium, or a combination thereof
A = a monovalent group selected from the following: isocyanate, urethane ($NHCO_2R'$), urea, amino
R' = monovalent radical
M = average number of trisubstituted isocyanurate rings
N = average number of isocyanuric acid and/or isocyanurate salt groups
$2M + N + 1$ = average number of divalent R groups
$M + 2$ = average number of A groups
wherein R preferably contains two to 40, more preferably two to 30, and most preferably four to 18 carbon atoms; R' preferably contains one to 40, more preferably one to 20, and most preferably one to 10 and wherein there are no N-to-N bonds and no A-to-N bonds, and no A-to-A bonds, and no R-to-R bonds.

Specific examples of especially preferred compounds are shown in FIGS. 2–5 of Ser. No. 72,288 filed 9/15/70.

Preferably the precipitating compounds will be present in the aqueous solutions in concentrations of about 0.01 to about 85, more preferably 0.10 to 50, and most preferably 0.25 to 25 weight percent. The viscosity of the aqueous solutions will be low enough to be injectable and will preferably be in the range of from about 0.1 to about 500, more preferably from about 0.25 to about 100, and most preferably from 0.50 to about 50 centipoises. While not necessary to the practice of the present invention, auxiliary agents, e.g. flocculating agents, or other salts, may be added to the aqueous solutions if desired for the particular application.

The preferred isocyanurate ring-containing compounds can be produced according to the methods of Canadian Pat. No. 831,994 granted Jan. 13, 1970 to Argabright, DePuy and Phillips. The most preferred polyisocyanuric acid derivatives having the structure drawn above can be prepared according to the techniques of West German application No. 1,816,521 which is a counterpart of copending U.S. Pat. application Ser. No. 715,199 filed Mar. 22, 1968, now U.S. Pat. No. 3,573,259.

The water used to form the aqueous solutions of the present invention can be fresh water or saline waters.

In order to prevent fingering of the aqueous solutions through the fluids which are being displaced by such solutions, the viscosity of the solutions may be increased by any of the conventional viscosity control agents, e.g., polyacrylamides, polyalkyleneoxides, polysaccharides, carboxymethyl cellulose, poly-vinyl pyrrolidones, various emulsions, algenic acids, agar-agar, and other gelatinous materials. The viscosity can be tailored according to known concepts of achieving favorable mobility ratio in which the viscosity of the displacing fluid is substantially equal to, and more preferably is greater than, the viscosity of the fluid being displaced.

pH Control

In utilizing the preferred isocyanuric acids and derivatives, the precipitation occurs by a controlled hydrolysis of these compounds to form water-insoluble precipitates. The desired degree of plugging of the pores of the formation and the placement of the plugged zone within the desired portion of the reservoir are accomplished by controlling both the rate of precipitation and the amount of precipitate. This rate of hydrolysis is related to pH of the solution at the time of injection. Having selected the rate of injection and the concentration, and knowing the temperature in the zone to be plugged, the optimum pH can be chosen by routine laboratory runs. In general, the higher the pH, the faster the hydrolysis and consequent precipitation. In general, the pH will be in the range of from about 4 to about 15, more preferably from about 6 to 15, and most preferably from about 8 to about 15 with the exact pH of the injection being selected so as to cause precipitation at the rate desired under the particular circumstances.

Injection Rate

The injection rate should be controlled so that the aqueous solution contacts each pore of the zone for a time sufficient to reduce permeability to the desired degree. Thus where the permeability of large volumes is to be reduced the injection of the fluids will preferably proceed at a controlled rate once the solution reaches that portion of the formation which is to be reduced in permeability.

In most cases it will be preferable to keep the initial rapid injection sufficiently slow as to avoid fracturing of the formation but fracturing may be desirable under specialized circumstances. Fracturing of the zone which is to be reduced in permeability will, in most instances, be carefully avoided.

Formation Permeability

In general, the permeability of the formation before treatment will range from about 0.001 to about 30,000, more preferably from 0.5 to about 10,000, and most preferably from 0.2 to about 5,000 millidarcies. After treatment, the permeability may range from 0.0,001 to about 25,000, more commonly from 500 to about 0.01 or may be reduced to zero.

Drive Fluids

The drive fluids used for displacement of the aqueous solutions of the present invention can be of conventional compositions. For example, aqueous solutions of partially hydrolyzed polyacrylamides, sugar, glycerins, starches, polyalkyleneoxides, carboxymethyl cellulose, etc., alcohols, ketones, aldehydes, emulsions, soluble oils, or foams, etc.

In other variations of the invention, successive quantities of the aqueous solutions of the present invention can have successively lower concentrations of either the salts of the invention or of the substantially non-precipitating viscosity control agents, or both, in order to gradually taper or step down the viscosity or equalize permeability reduction. This permits optimal control of mobility with substantially minimal pressure drop.

EXAMPLES

The invention will be better understood by a reading of the illustrative examples which follow.

EXAMPLE I

Preparation of Polyisocyanurate Salt

A 2,000 ml four-necked glass reactor equipped with a motor driven stirrer, reflux condenser, thermometer and adapter for introducing liquid is charged with 43.3 g of potassium cyanate (0.53 mole) and 1,000 ml of anhydrous dimethylformamide (DMF). To the resulting slurry at 75° C., 71 ml of toylene diisocyanate (0.50 mole) is added dropwise at a rate of 0.428 ml/min. by means of a motor-driven syringe pump. After the addition was complete, the mixture was allowed to react an additional 10 min., cooled to 60° C., 100 ml of methanol added, and the temperature permitted to drop to 23° C. The desired product was collected by filtration of the crude reaction mixture, extracted with acetone in a Soxhlet apparatus and dried to give 130.4 g of a pale yellow powder.

The product is water-soluble but relatively insoluble in hydrocarbon solvents.

The ratio of aromatic rings to end groups:

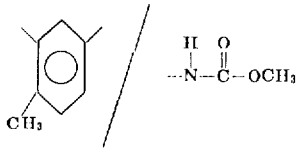

was measured by N.M.R. (in $D_2O$) to be 12.8. This corresponds to a minimum average molecular weight of 6,500.

EXAMPLE II

A sample of fired Berea sandstone having a cylindrical shape 3 inches in diameter and 2 feet in length is chosen as a model porous medium. Two differential pressure taps are installed in the core. One pressure tap is placed near the entrance end of the porous medium (pressure tap A); the other is located near the center (pressure tap B). The initial permeability to the flow of 1.8 percent NaCl solution is determined as the average of the permeability values obtained at selected flow rates. An initial permeability of 144 md is measured at pressure tap A, whereas B yields a permeability of 119 md.

At this point a 3 percent aqueous solution of the compounds produced in Example I (1M in NaOH) is injected into the core, displacing the NaCl solution. The total amount of this fluid injected is approximately 1.2 pore volumes. This fluid is then allowed to remain in the core for roughly 40 hours. After this time the permeability of the core is redetermined with 1.8 percent NaCl solution.

| $K_{initial}$ | $K_{final}$ | $K_{final}/K_{initial}$ | Pressure Tap |
|---|---|---|---|
| 144 md | 1.6 md | 0.011 | A |
| 119 md | 1.2 md | 0.010 | B |

EXAMPLE III

In Fig. 1, an injection well 1 and a production well 3, each penetrate a reservoir comprising an oil-bearing zone 4, various overlaying zones 5 and 6 and an underlaying zone 7. The natural pressure drive of the oil in oil-bearing zone 4 has be depleted so that no substantial quantity of oil is produced through production well 3.

As the first step in the treatment of zone 4 according to the present invention, there is injected approximately 0.20 pore volumes of aqueous solutions containing NaOH and isocyanurate salts of the type formed in Example I of the present invention, together with sufficient polyethylene oxide (Polyox of Union Carbide Corp.) to increase the viscosity to about the same as that of the oil in place, about 30 centipoises in this case. This aqueous solution is first injected into a zone 8 immediately surrounding the well bore.

Figure 2:
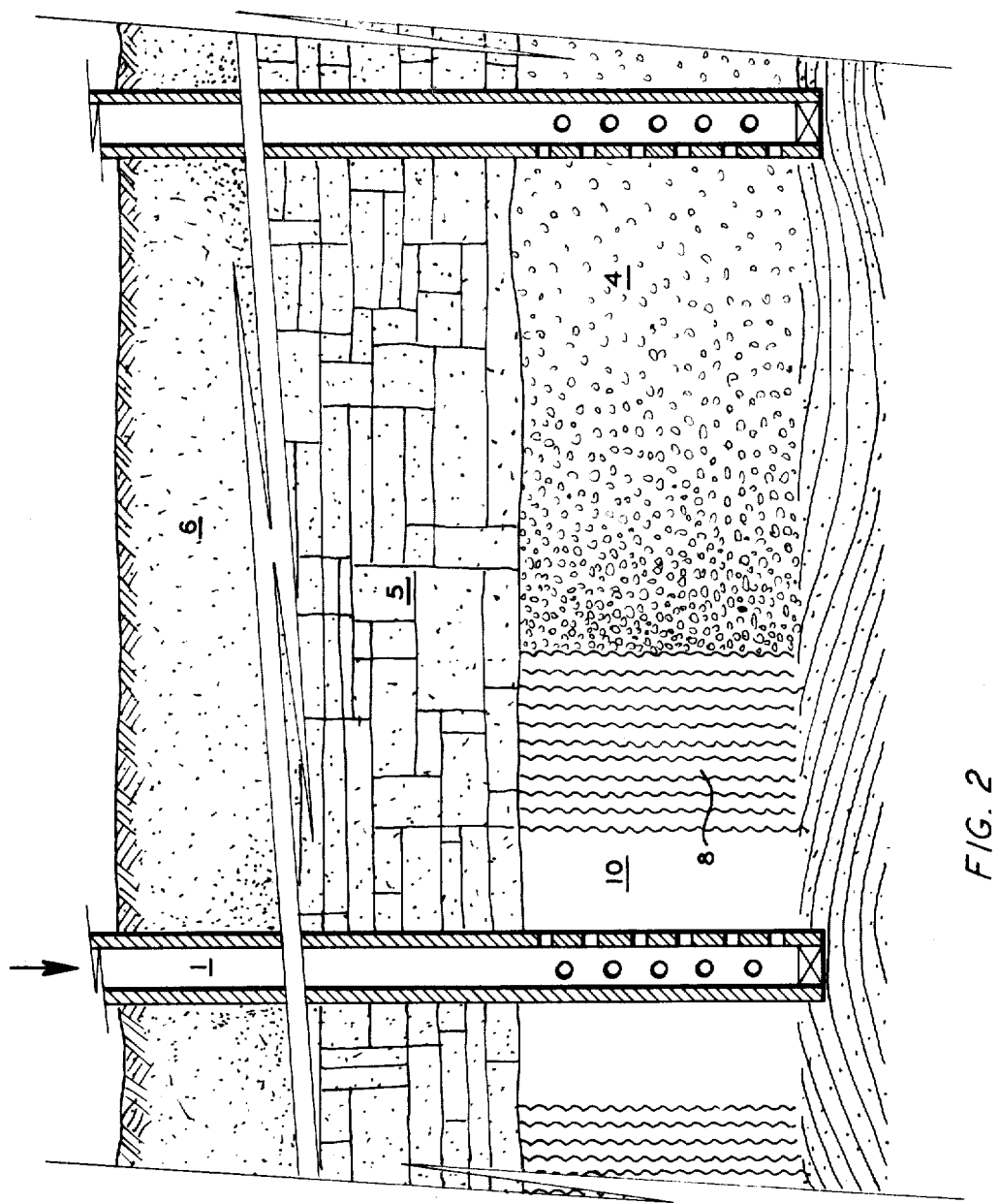

Referring to FIG. 2, sufficient water thickened with polyethylene oxide to provide a viscosity of approximately 30 centipoises at 20° C., is injected through the injection well 1, displacing the aqueous solution of isocyanurate salts 8 to a point about 10 feet away from the well bore. This injection is accomplished immediately after the injection of the original isocyanurate salt solution. The pH of the original salt solution is adjusted to approximately 12–13 so that virtually no precipitation has occurred during the movement of the isocyanurate salt solution to the position shown in FIG. 2.

Figure 3:
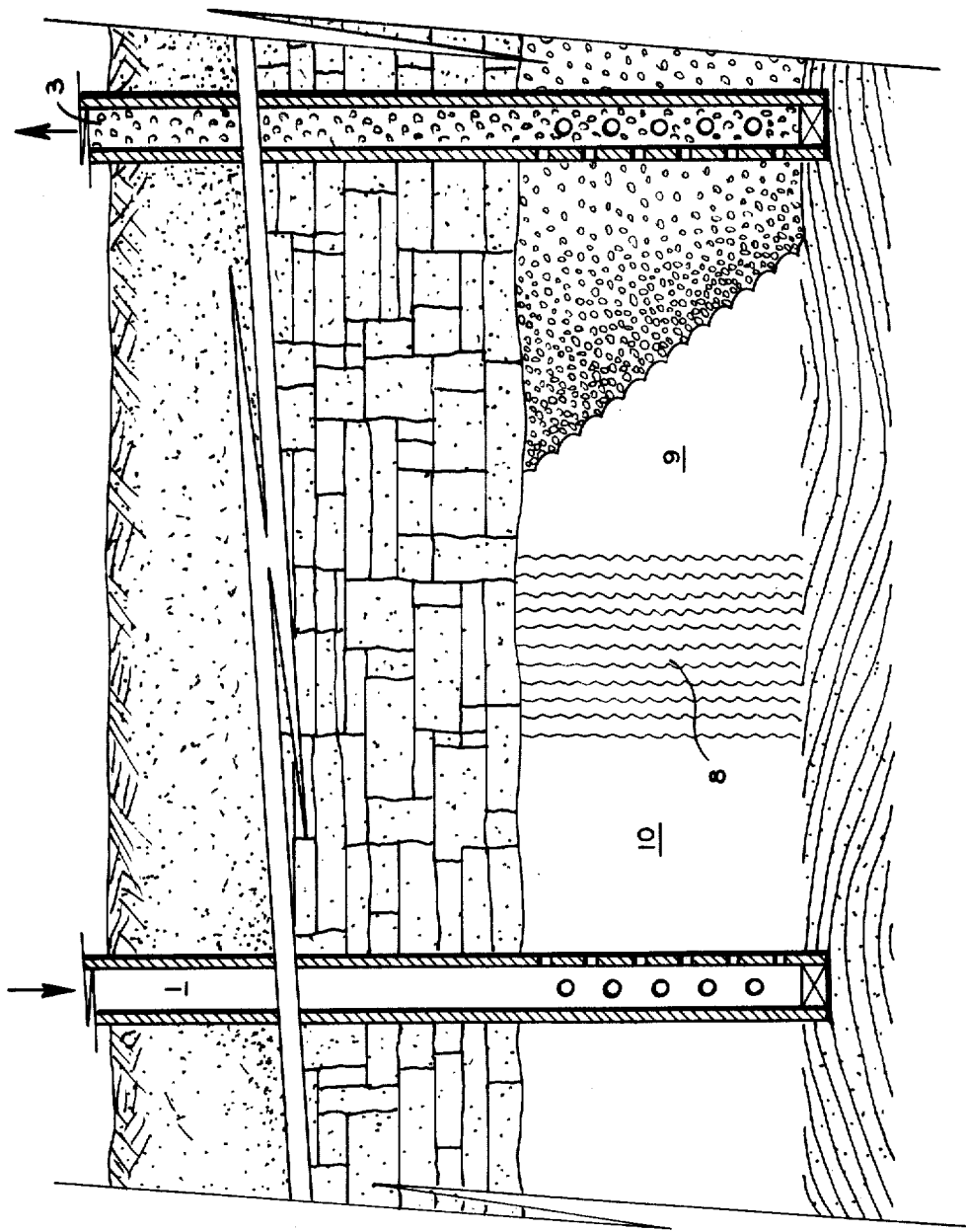

Referring to FIG. 3, additional quantities of thickened water having successively lower viscosities are injected into the formation through production well 1 and moved through zone 10 and zone 8 successively to displace the oil-in-place in zone 9, driving it through the formation until it is produced from production well 3. "Fingering" of this drive water through the aqueous solution is reduced by the favorable mobility ratio provided by the permeability reduction in zone 8, as caused by precipitation of the isocyanurates of the invention.

Precipitation from the aqueous solution continues as the solution is displaced through the formation reducing the permeability of zone 8, substantially, while the permeability of zone 10 through which the aqueous solution was displaced before precipitation, remains substantially unchanged.

Modification of the Invention

It should be understood that the invention is capable of a variety of modifications and variations which will be made apparent to those skilled in the art by a reading of the specification and which are to be considered as included within the spirit of the claims appended hereto.

What is claimed is:

1. In a process for the displacement of oil in subterranean formations which contain an oil-bearing zone and a well penetrating into said oil-bearing zone, the improvement comprising in combination the steps of:
   a. injecting into said oil-bearing zone a quantity of an aqueous solution of compounds which hydrolyze to precipitate over a pH-dependent time period to form a mass of precipitate,
   b. adjusting the pH of said aqueous solutions to control the time of occurrence of said precipitation so as to reduce permeability to the desired degree based on the rate of movement of said aqueous solution through said formation,
   c. thereafter injecting into said well a quantity of a drive fluid which does not contain said compounds,
   d. displacing said aqueous solution through said formation while permitting said aqueous solution of compounds which precipitate over a time period to precipitate forming within said oil-bearing zone, said precipitate being deposited in sufficient quantities to substantially reduce the permeability of said portion of said oil-bearing zone, without rendering said portion impermeable to flow of fluids, improving the mobility control in said displacement process.

2. A process according to claim 1 wherein said aqueous solution also contains a substantially non-precipitating viscosity control agent.

3. A process according to claim 1 wherein the quantity of drive fluid injected into said formation is sufficient to displace substantially all of said aqueous solution a distance of at least 5 feet from said well.

4. The process according to claim 1 wherein at least a portion of said oil is displaced into a production well.

5. A process according to claim 1 wherein a portion of drive fluid is injected into said formation after the precipitation of said compounds, and whereby said quantity of compound precipitated is sufficient to substantially reduce the permeability of said zone but is not sufficient to completely block fluid flow.

6. A process according to claim 5 wherein a quantity of drive fluid injected after said precipitation causes displacement of said oil into a production well in fluid communication with said first mentioned well.

7. In a process for the displacement of oil in subterranean formations which contain an oil-bearing zone and a well penetrating into said oil-bearing zone, the improvement comprising in combination the steps of:
   a. injecting into said oil-bearing zone a quantity of an aqueous solution of compounds which hydrolyze to precipitate over a pH-dependent time period to form a mass of precipitate,
   b. adjusting the pH of said aqueous solutions to control the time of occurrence of said precipitation so as to reduce permeability to the desired degree based on the rate of movement of said aqueous solution through said formation,
   c. thereafter injecting into said well a quantity of a drive fluid which does not contain said compounds,
   d. displacing said quantity of aqueous solution of compounds which precipitate over a time period a distance away from said well by the action of said drive fluids,
   e. permitting said aqueous solution of compounds which precipitate over a time period to contact portions of the formation which are spaced a distance away from said well, for a time sufficient to cause the precipitate to form within said portions of said oil-bearing zone, said precipitate being deposited in sufficient quantities to substantially reduce the permeability of said portion of said oil-bearing zone, without rendering said portion impermeable to flow of fluids, improving the mobility control in said displacement process.

8. In a process for the displacement of oil in subterranean formations which contain an oil-bearing zone and a well penetrating into said oil-bearing zone, the improvement comprising in combination the steps of:
   a. injecting into said oil-bearing zone a quantity of an aqueous solution of compounds which precipitate over a pH dependent time period to form a mass of precipitate,
   b. adjusting the pH of said aqueous solutions to control the time of occurrence of said precipitation so as to reduce permeability to the desired degree based on the rate of movement of said aqueous solution through said formation,
   c. thereafter injecting into said well a quantity of a drive fluid which does not contain said compounds,
   d. displacing said aqueous solution through said formation while permitting said aqueous solution of compounds which precipitate over a time period to precipitate forming within said oil-bearing zone, said precipitate being deposited in sufficient quantities to substantially reduce the permeability of said portion of said oil-bearing zone, without rendering said portion impermeable to flow of fluids, improving the mobility control in said displacement process.

9. The process of claim 8 wherein the aqueous solution comprises isocyanurate derivatives having the structure:

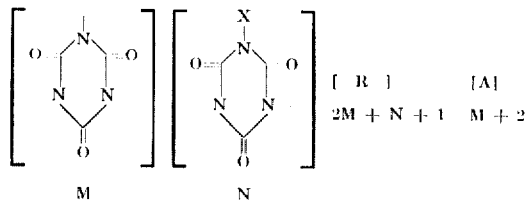

where
R = divalent radical
X = a metal (e.g., Na, K, Li), hydrogen, quaternary ammonium or a combination thereof,
A = monovalent group selected from the following: isocyanate, urethane, urea, amino, $NH_2CO_2R'$,
R' = monovalent radical
M = average number of trisubstituted isocyanurate rings
N = average number of isocyanuric acid or derivative rings
2M + N + 1 = average number of divalent R groups
M + 2 = average number of A groups.

10. The process of claim 8 wherein the aqueous solution has a pH in the range of from about 8 to about 15.